United States Patent
Dessero et al.

(10) Patent No.: US 10,358,223 B2
(45) Date of Patent: Jul. 23, 2019

(54) AIRCRAFT GALLEY EXHAUST SYSTEM AND METHOD OF ASSEMBLING SAME

(71) Applicant: The Boeing Company, Chicago, IL (US)

(72) Inventors: Michael J. Dessero, Mill Creek, WA (US); Luong Hoang Le, Everett, WA (US); Thomas J. Moran, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 15/409,802

(22) Filed: Jan. 19, 2017

(65) Prior Publication Data
US 2017/0129615 A1    May 11, 2017

Related U.S. Application Data

(62) Division of application No. 12/181,914, filed on Jul. 29, 2008, now Pat. No. 9,555,892.

(51) Int. Cl.
| | |
|---|---|
| *F25B 9/00* | (2006.01) |
| *B64D 13/00* | (2006.01) |
| *B64D 13/08* | (2006.01) |
| *B64D 11/04* | (2006.01) |
| *B64D 13/06* | (2006.01) |

(52) U.S. Cl.
CPC ............ *B64D 13/08* (2013.01); *B64D 11/04* (2013.01); *B64D 2013/0629* (2013.01); *B64D 2013/0674* (2013.01); *Y10T 29/49428* (2015.01)

(58) Field of Classification Search
CPC ................ B64D 13/08; B64D 11/04; B64D 2013/0629; B64D 2013/0674
USPC .................................................. 454/76
See application file for complete search history.

(56) References Cited

U.S. PATENT DOCUMENTS

| | | | |
|---|---|---|---|
| 2,333,309 A | 11/1943 | Gould | |
| 2,628,482 A | 2/1953 | Burgess | |
| 2,963,879 A | 12/1960 | De Paravicini | |
| 4,014,179 A | 3/1977 | Iles et al. | |

(Continued)

FOREIGN PATENT DOCUMENTS

| | | |
|---|---|---|
| EP | 1553364 A2 | 7/2005 |
| JP | 2003034299 A  * | 2/2003 |

OTHER PUBLICATIONS

English translateion of patent JP2003034299A and abstract translation of JP2003034299A.*

*Primary Examiner* — Helena Kosanovic
(74) *Attorney, Agent, or Firm* — Armstrong Teasdale LLP

(57) ABSTRACT

An exhaust system for an aircraft galley chiller is provided. The exhaust system includes a galley having a chiller that includes an inlet, a condenser fan inlet, a condenser fan outlet proximate to chiller inlet, and a first flow of air through the condenser, an air ventilation outlet conduit that includes a second flow of air therethrough, and an ejector pump. The ejector pump includes a first airflow inlet, a second airflow inlet and an airflow outlet, wherein the first airflow inlet is coupled in flow communication with the condenser fan outlet, the second inlet is coupled in flow communication with the air ventilation outlet conduit. As the second airflow increases, the first velocity increases in a direction away from the galley chiller facilitating a decrease in temperature at the condenser fan inlet.

19 Claims, 4 Drawing Sheets

(56) References Cited

U.S. PATENT DOCUMENTS

| | | |
|---|---|---|
| 4,399,665 A | 8/1983 | Evans et al. |
| 4,437,320 A | 3/1984 | Eklund |
| 4,840,036 A | 6/1989 | Spraker, Jr. |
| 4,966,005 A | 10/1990 | Cowell et al. |
| 4,969,509 A | 11/1990 | Merensky |
| 5,112,010 A | 5/1992 | Simison |
| 5,137,230 A | 8/1992 | Coffinberry |
| 5,369,960 A | 12/1994 | Mueller et al. |
| 5,491,979 A | 2/1996 | Kull et al. |
| 5,513,500 A | 5/1996 | Fischer et al. |
| 5,899,085 A | 5/1999 | Williams |
| 5,939,800 A | 8/1999 | Artinian et al. |
| 6,124,646 A | 9/2000 | Artinian et al. |
| 6,394,760 B1 | 5/2002 | Tell |
| 6,401,473 B1 | 6/2002 | Ng et al. |
| 6,571,574 B1 | 6/2003 | Blackstone |
| 6,845,627 B1 | 1/2005 | Buck |
| 6,880,351 B2 | 4/2005 | Simadiris et al. |
| 6,886,782 B2 | 5/2005 | Laugt |
| 7,024,874 B2 | 4/2006 | Zywiak et al. |
| 7,028,753 B2 | 4/2006 | Sterner |
| 7,059,148 B2 | 6/2006 | Ozaki |
| 7,121,100 B2 | 10/2006 | Atkey et al. |
| 2005/0076661 A1 | 4/2005 | Zywiak et al. |
| 2007/0277538 A1 | 12/2007 | Buck |
| 2008/0087039 A1 | 4/2008 | Reed et al. |
| 2009/0260387 A1* | 10/2009 | DeFrancesco ......... B64D 13/08 62/401 |

* cited by examiner

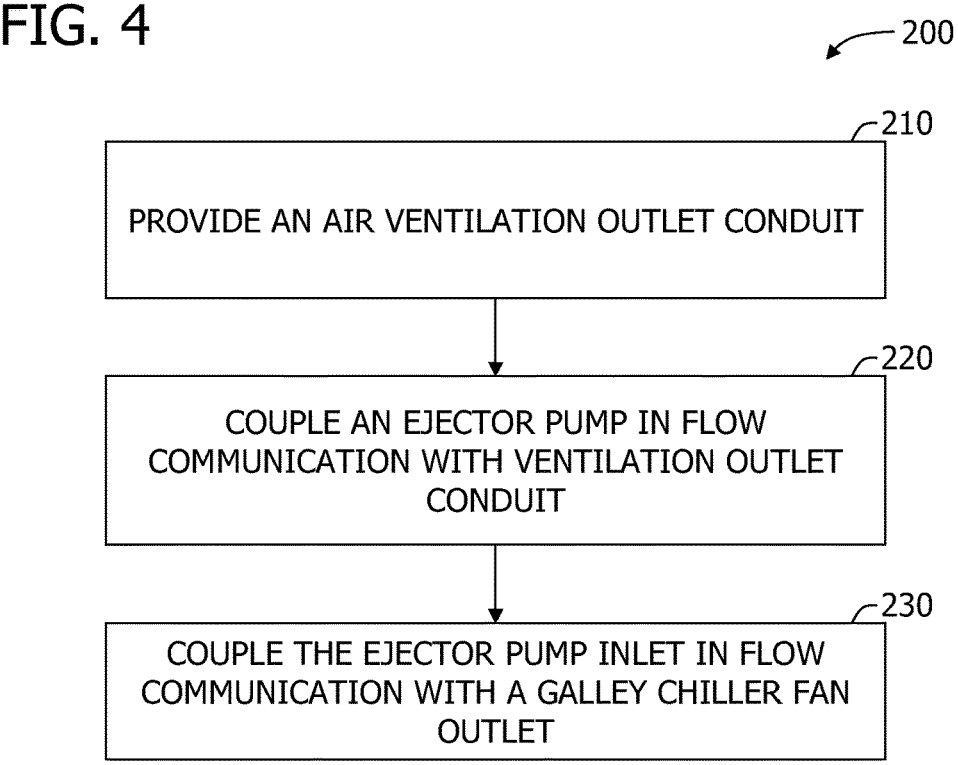
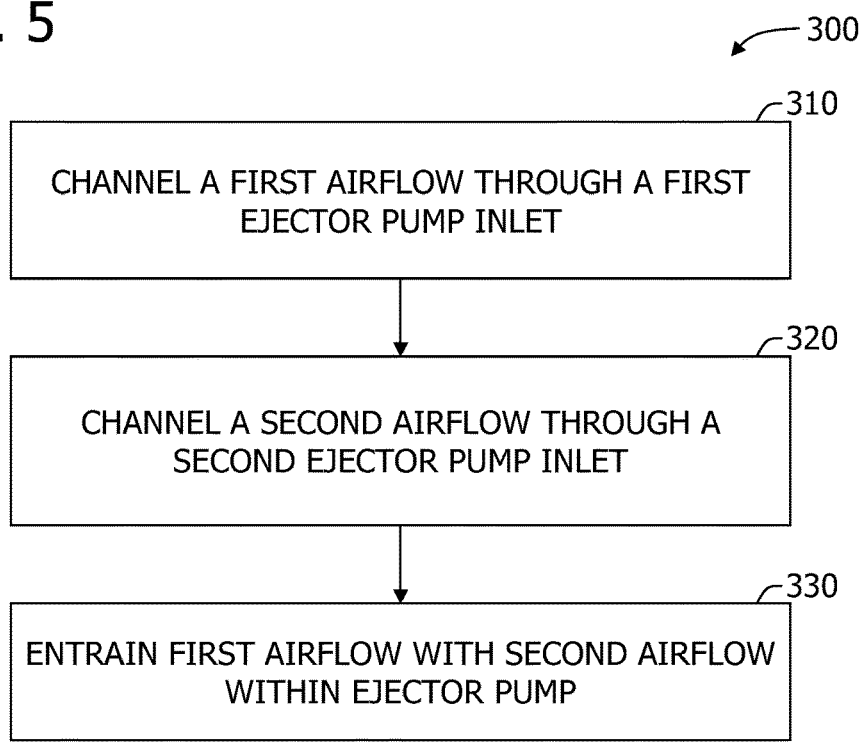

AIRCRAFT GALLEY EXHAUST SYSTEM AND METHOD OF ASSEMBLING SAME

CROSS-REFERENCE TO RELATED APPLICATIONS

This application is a divisional and claims priority to U.S. patent application Ser. No. 12/181,914 filed Jul. 29, 2008, and issued as U.S. Pat. No. 9,555,892 on Jan. 31, 2017, for "AIRCRAFT GALLEY EXHAUST SYSTEM AND METHOD OF ASSEMBLING SAME", which is hereby incorporated by reference in its entirety.

BACKGROUND

The field of the disclosure relates generally to galley chiller systems for use on an airplane, and more specifically to a galley chiller condenser exhaust system that uses a secondary air source and an ejector pump to vent chiller condenser exhaust heat.

To minimize public health risks, compliance standards have been issued that mandate transportation industries maintain servable food at 4° C. (39° F.). Some known galley chiller systems cannot perform to the extent needed to meet these compliance regulations due to the system's limited exhaust fan capacity that results in a limited capacity to vent condenser exhaust heat. Moreover, galley chillers can not be increased in size without major changes to airplane structures and power systems. As a result, airlines may be fined by government agencies. Therefore, chiller performance must be increased, for example, by decreasing chiller condenser inlet temperatures, without subsequently increasing chiller size or power consumption.

More specifically, known galley chiller systems include a compressor for use in pumping a refrigeration fluid to a condenser that in turn transfers heat from the compressed fluid to the surrounding environment. The fluid from the condenser is regulated through an expansion valve to an evaporator where the refrigerant fluid expands to cool. The location of the galley chiller system condenser is such that typically a portion of the heat from the condenser is transferred to a cabin air recirculation system, which increases the load on the aircraft cooling system.

Known commercial aircraft include at least several non-integrated cooling systems. For example, an aircraft cooling system primarily provides cooling for the aircraft cabin area. A power electronics cooling system cools the power electronics of various aircraft systems to maintain the electronics within a desired temperature range. Additionally, such aircraft may also utilize a Lavatory/Galley Ventilation system which vents lavatories, galley work spaces, ovens, in-flight entertainment (IFE) equipment and avionics equipment throughout the aircraft. Some known aircraft use a dedicated chiller exhaust system that utilizes a high capacity fan and duct system to exhaust the chiller condenser heat. Over time, larger galleys have been added to some commercial aircraft to meet the longer flight time food-service requirements. Such known chiller exhaust systems are limited by the system's fan capacity and cannot vent galleys chillers, especially those galleys located aft of the wing box. However, simply adding an additional aft chiller exhaust system is not feasible due to space limitations, airflow management issues, smoke penetration certification requirements, and the additional electrical loads that would be exerted by such a system. Moreover, the lavatory/galley ventilation system may not be feasible as a chiller exhaust solution because most current lavatory/galley ventilation systems operate at maximum capacity.

SUMMARY

One aspect is directed to an exhaust system for an aircraft galley chiller. The exhaust system includes a galley, a condenser, an air ventilation outlet conduit, and an ejector pump. The ejector pump includes a first airflow inlet, a second airflow inlet and an airflow outlet, wherein the first airflow inlet is coupled in flow communication with a condenser fan outlet, the second inlet is coupled in flow communication with the air ventilation outlet conduit. As the second airflow increases, the first velocity increases in a direction away from the galley facilitating a decrease in temperature at the condenser fan inlet.

Another aspect is directed to an aircraft galley exhaust assembly that includes an ejector pump. The ejector pump includes a first airflow inlet configured to receive a first flow of air therethrough, a second airflow inlet configured to receive a second flow of air therethrough, and an airflow outlet. The first airflow inlet is coupled in flow communication with a condenser fan outlet, and the second inlet is coupled in flow communication with an air ventilation outlet conduit. The second airflow increases the first velocity away from the galley chiller thus facilitating a decrease in temperature at said condenser fan inlet.

Another aspect is directed to a method of assembling a galley chiller exhaust system, wherein the galley chiller includes a condenser fan inlet and a condenser fan outlet, and the method includes providing an air ventilation outlet conduit, coupling an ejector pump in flow communication with the air ventilation outlet conduit, the ejector pump comprising an inlet, and coupling the ejector pump inlet in flow communication with the galley chiller fan outlet.

BRIEF DESCRIPTION OF THE DRAWINGS

FIG. 4 is a flow diagram of an exemplary method for assembling a galley chiller exhaust system.

FIG. 5 is a flow diagram of an exemplary method for exhausting air from an aircraft galley chiller.

DETAILED DESCRIPTION

Figure 1:
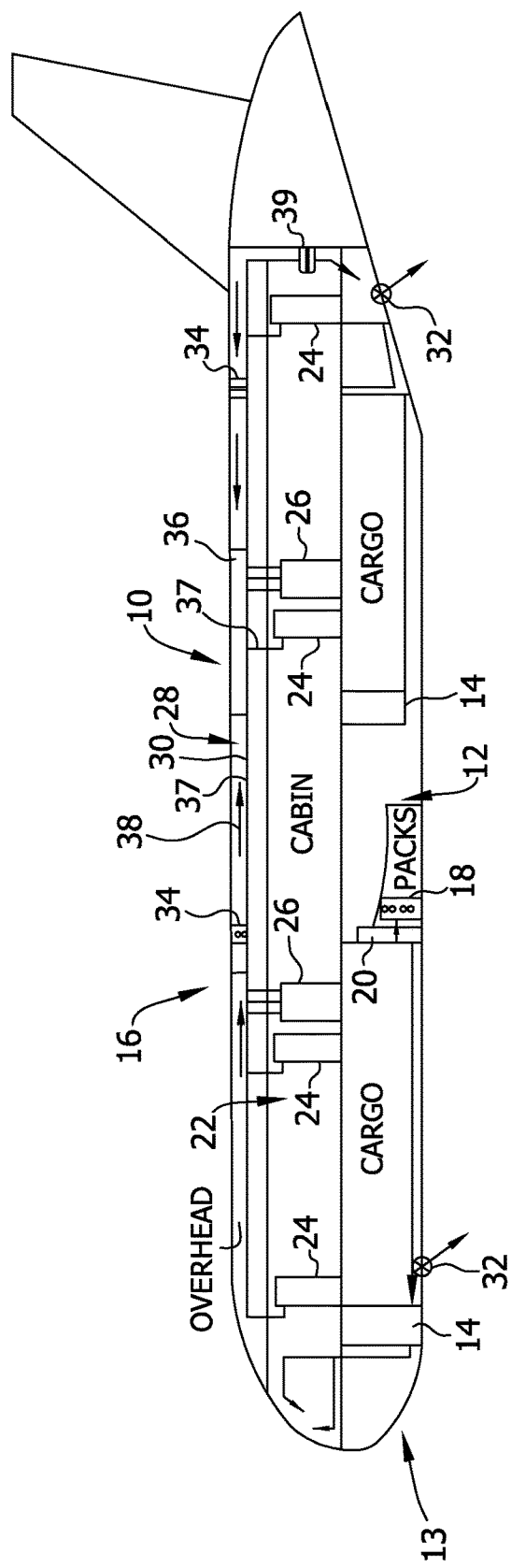
FIG. 1 is an internal side view of an exemplary commercial aircraft.

FIG. 1 is an internal side view of an exemplary commercial aircraft 10 that includes a cargo area 12 within a lower portion 13 of aircraft 10. Aircraft 10 includes a plurality of galleys 24 that are positioned in various convenient locations within a cabin area 22. Galleys 24 house multiple galley carts (not shown) containing food and other perishable goods, and each galley 24 includes ducting that delivers cooled air to the carts from a galley chiller 36. In the exemplary embodiment, galleys 24 and lavatories 26 vent air and odors to a ventilation assembly 30 located in an overhead area 28 located above the cabin area 22. Alternatively, ventilation assembly 30 may be located in a lower portion 13 of aircraft 10. Air from the flight deck, lavatories, galleys and other areas of the aircraft may be pumped out of ventilation assembly 30 by a fan 39 through an outflow valve 32 exhausting the air to the outside environment.

In the exemplary embodiment, a galley chiller system 36 is provided that is located in the overhead area 28. Alternatively, galley chiller system 36 or components thereof may be located in any suitable area within the aircraft 10. Aircraft cooling system 16 includes ducting 37 having an overhead recirculation air duct 38 located within the overhead area 28. The air may be delivered from the recirculation air duct by recirculation fans 34. The aircraft cooling system 16 cools the air channeled to the cabin area 22.

Figure 2:
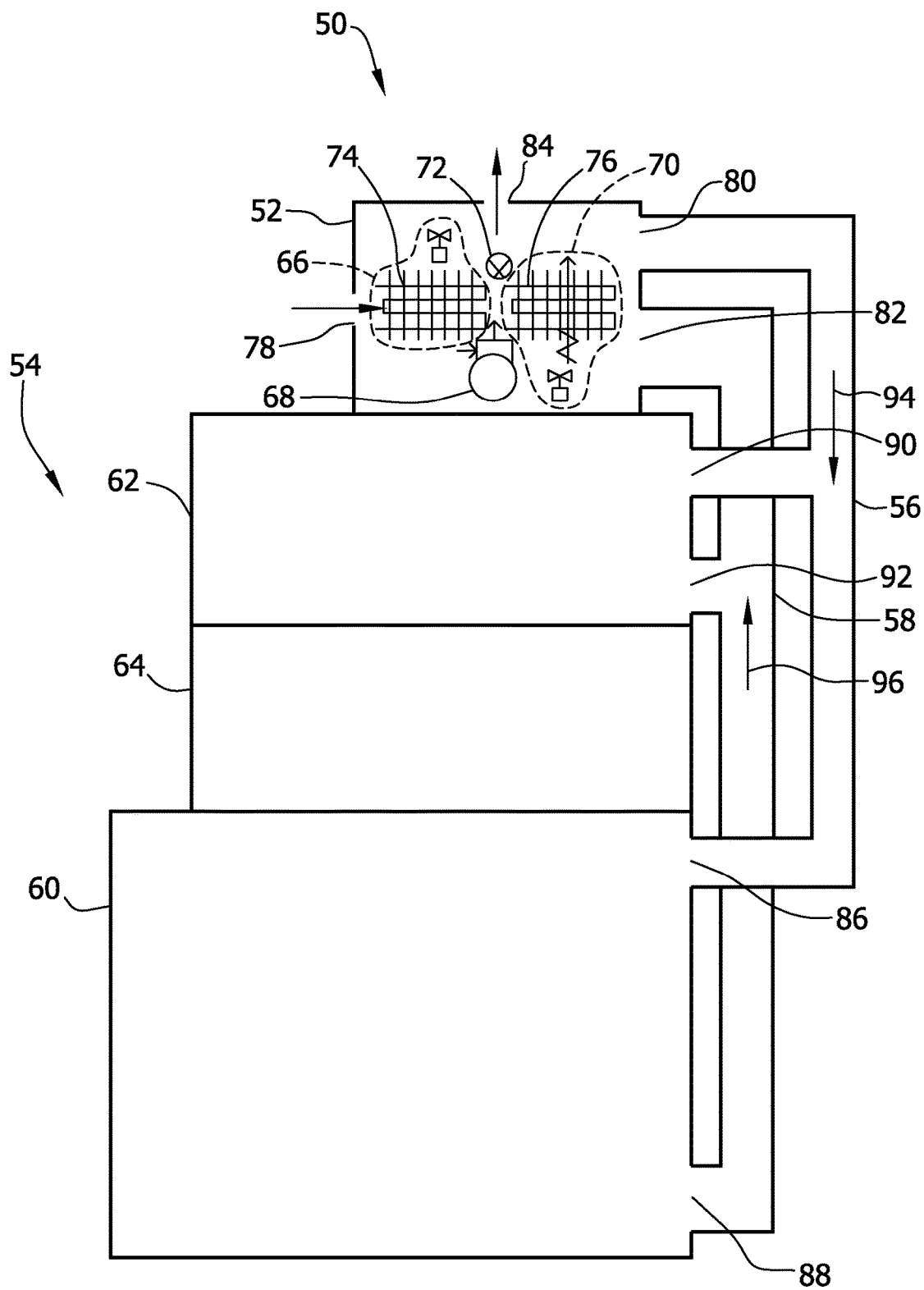
FIG. 2 is a schematic view of an exemplary exhaust system for use in the aircraft shown in FIG. 1.

FIG. 2 is a schematic view of an aircraft galley chiller 50 used in aircraft 10 shown in FIG. 1. In the exemplary embodiment, aircraft galley chiller 50 includes an air chiller 52, a galley 54, a supply ducting assembly 56 and a return ducting assembly 58. In the exemplary embodiment, galley 54 includes a chilled galley cart 60, a chilled galley compartment 62, and a non-chilled storage compartment 64. Alternatively, galley 54 may include any number of chilled and non-chilled compartments. In the exemplary embodiment, air chiller 52 includes a condenser 66, a compressor 68, an evaporator 70, an expansion valve 72, a condenser heat exchanger 74 and an evaporator heat exchanger 76, and integral controller (not shown). Additionally, air chiller 52 includes an air inlet 78, an air supply outlet 80, a return flow inlet 82 and an exhaust port 84.

In the exemplary embodiment, galley cart 60 includes an air inlet 86 and an air outlet 88. Similarly, chilled galley compartment 62 includes an air inlet 90 and an air outlet 92. Air inlets 86 and 90 are coupled in flow communication with air supply outlet 80 via supply evaporative ducting assembly 56. Air outlets 88 and 92 are coupled in flow communication with return flow inlet 82 via return ducting assembly 58. A chilled evaporative air flow 94 is channeled from air supply outlet 80 of air chiller 52 into chilled galley compartment 62 and galley cart 60 via supply ducting assembly 56. Chilled evaporative air flow 94 is then distributed within galley compartment 62 and galley cart 60 where perishable food (not shown) may be stored, and wherein heat may be transferred from the food to the evaporative air flow 94. An Exhaust evaporative air flow 96 is then channeled from outlets 88 and 92 to return flow inlet 82 of air chiller 52 via return ducting assembly 58, wherein it is chilled, as described in more detail herein.

In the exemplary embodiment, during operation, air chiller 52 functions as a vapor cycle system, wherein compressor 68 pumps a refrigerant fluid (not shown) to condenser 66. Heat from the compressed fluid within condenser 66 is rejected from condenser heat exchanger 74 to the surrounding environment through exhaust port 84, thereby lowering the refrigerant fluid temperature. Alternatively, air chiller 52 may function as any refrigerated system that enables aircraft galley chiller 50 to function as described herein. The refrigerant then flows to evaporator 70 through expansion valve 72. As the fluid exits expansion valve 72, the fluid expands and further lowers the fluid temperature. Heat is then transferred from the air within evaporative ducting assemblies 56 and 58 to the fluid refrigerant, across evaporator heat exchanger 76. Refrigerant fluid is channeled to the condenser heat exchanger 74, where the cycle begins again. The process is controlled by an integral control card (not shown) within air chiller 52.

Figure 3:
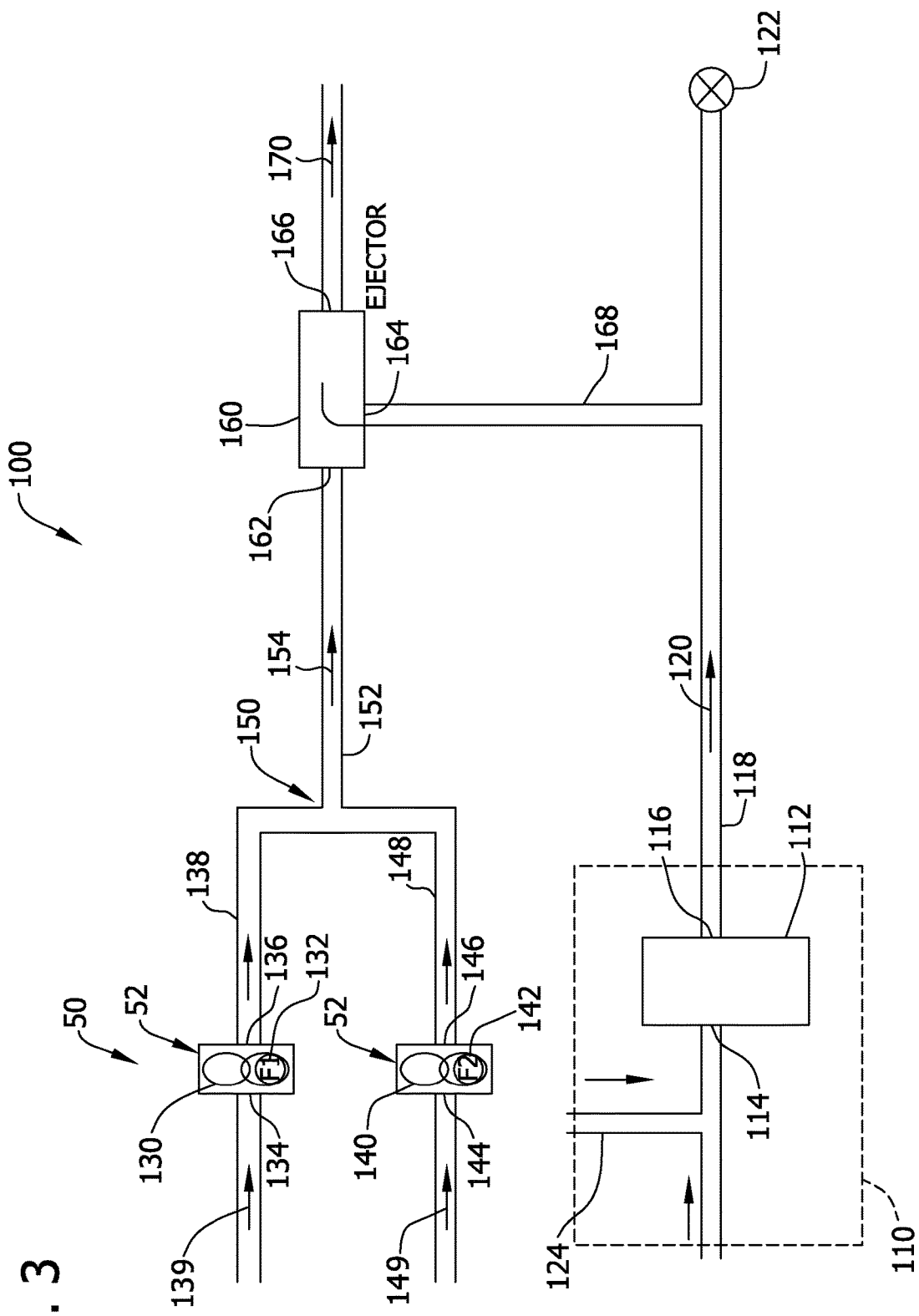
FIG. 3 is a detailed schematic view of the exhaust system shown in FIG. 2.

FIG. 3 is a detailed schematic view of aircraft galley chiller 50 used in an exhaust system 100, shown in FIG. 2. In the exemplary embodiment, exhaust system 100 includes ventilation assembly 110 that includes a ventilation fan 112 having an inlet 114 and an outlet 116, and an air ventilation conduit 118 extending downstream from outlet 116. A high pressure airflow 120 (referred to herein also as a "second flow of air") within ventilation assembly 110 from the flight deck, lavatories, galleys and other areas of the aircraft is evacuated by ventilation fan 112 through air ventilation conduit 118 to an outflow valve 122 that evacuates airflow 120 from aircraft 10. A bypass fan inlet 124 is included in ventilation assembly that facilitates providing a substantially constant air flow-rate through ventilation assembly 110. In the exemplary embodiment, exhaust system 100 also includes a first condenser 130 that includes a fan 132 having an airflow inlet 134 and an airflow outlet 136, and an exhaust duct 138 for use in channeling exhaust airflow from first condenser 130, wherein fan 132 produces a flow of air 139 (referred to herein also as a "first flow of air") through condenser 130. Exhaust system 100 includes a similar second condenser 140 that includes a fan 142 having an inlet 144 and an outlet 146 and an exhaust duct 148 for use in channeling exhaust airflow from second condenser 140, wherein fan 142 produces a flow of air 149 through condenser 140. First condenser exhaust duct 138 and second condenser exhaust duct 148 intersect at a joint 150 to form a chiller airflow outlet 152 that includes a chiller exhaust airflow 154 therethough. Alternatively, galley chiller system 36 may have any number of condensers that enables aircraft 10 to function as described herein.

In the exemplary embodiment, exhaust system 100 includes an ejector pump 160 that includes a first airflow inlet 162, a second airflow inlet 164 and an airflow outlet 166. First airflow inlet 162 is coupled in flow communication with chiller airflow outlet 152, and ejector pump second airflow inlet 164 is coupled in flow communication with the air ventilation conduit 118. More specifically, an ancillary conduit 168 extends between air ventilation conduit 118 and ejector pump second inlet 164 that enables high pressure airflow 120 to be divided and channeled from air ventilation conduit 118 to ejector pump 160. A combined flow of air 170 is then exhausted from outlet 166.

During operation, high pressure airflow 120 is channeled from air ventilation conduit 118 to ejector pump 160. As high pressure airflow 120 enters ejector pump second inlet 164 a suction force, or vacuum, is created. Ejector pump 122 increases the velocity of high pressure airflow 120 and decreases a pressure of the flow therein. This decrease in pressure entrains chiller exhaust airflow 154 entering ejector pump first airflow inlet 162, thereby increasing the velocity of chiller exhaust airflow within chiller airflow outlet and facilitates evacuating air surrounding the airflow inlets 134, 144 of respective condensers 130, 140. This increased evacuation of airflow surrounding condensers 130, 140 facilitates decreasing the inlet temperature at each condenser fan inlet 134, 144. In the exemplary embodiment, this drop in inlet flow temperature enables condensers 130, 140 to function more efficiently and facilitates producing and maintaining a cooler chiller internal temperature.

FIG. 4 is a flow diagram of an exemplary method 200 for assembling a galley chiller exhaust system. In the exemplary method, an air ventilation conduit is provided 210. Next, an ejector pump is provided that includes a first airflow inlet, a second airflow inlet and an airflow outlet. The first airflow inlet of the ejector pump is coupled 220 in flow communication with the air ventilation outlet conduit, and the second airflow inlet of the ejector pump is coupled 230 in flow communication with a condenser fan outlet. In the exemplary method, a first flow of air is channeled through the first inlet of the ejector pump at a first velocity and a second flow of air is channeled through the second airflow inlet of the ejector pump at a second velocity, such that the second velocity is greater than said first velocity. This velocity gradient provides a pressure difference that facilitates entraining the first flow of air with the second flow of air and forms a combined flow of air that exits ejector pump through the airflow outlet of the ejector pump.

FIG. 5 is a flow diagram of an exemplary method for exhausting air from an aircraft galley chiller. In the exemplary method, a first flow of air is channeled 310 through a first airflow inlet of an ejector pump at a first velocity and a second flow of air is channeled 320 through a second airflow inlet of the ejector pump at a second velocity, such that the second velocity is greater than said first velocity. This velocity gradient provides 330 a pressure difference that facilitates entraining the first flow of air with the second flow of air and forms a combined flow of air that exits the ejector pump through an airflow outlet of the ejector pump.

Exemplary embodiments of exhaust systems used in the aviation industry are described in detail above. The above-described data exhaust systems include channeling an exhaust stream from the lavatory/galley ventilation assembly to facilitate increasing the airflow away from the aircraft chiller condensers. Moreover, this design is particularly useful to lower the condenser inlet flow temperature and thus facilitate increasing the chiller efficiency in maintaining temperatures within mandated standards. Existing solutions rely on using a compressor for use in pumping a refrigeration fluid to a condenser that in turn rejects heat from the compressed fluid to the surrounding environment. The fluid from the condenser is regulated through an expansion valve to an evaporator where the refrigerant fluid expands to cool the fluid. The location of the galley chiller system condenser is such that typically a portion of the heat from the condenser is rejected to the cabin area, which increases the load on the aircraft cooling system. Chiller performance must be increased, for example, by decreasing chiller condenser inlet temperatures, without subsequently increasing chiller size or power consumption.

Although the foregoing description contains many specifics, these should not be construed as limiting the scope of the present disclosure, but merely as providing illustrations of some of the presently preferred embodiments. Similarly, other embodiments of the disclosure may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications to the disclosure as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a galley chiller exhaust system, the galley chiller exhaust system including a condenser fan inlet and a condenser fan outlet that discharges a first flow of air having a first pressure, the galley chiller exhaust system further including an air ventilation conduit configured to channel a second flow of air therethrough having a second pressure greater than the first pressure, said method comprising:
    coupling an ejector pump in flow communication with the air ventilation conduit, the ejector pump comprising a first airflow inlet, a second airflow inlet and an airflow outlet;
    coupling the first airflow inlet of the ejector pump in flow communication with the condenser fan outlet of the galley chiller exhaust system to receive the first flow of air; and
    coupling the second airflow inlet of the ejector pump in flow communication with the air ventilation conduit to receive the second flow of air, wherein the ejector pump is configured to increase a velocity of the second flow of air such that the second pressure is decreased, and such that a suction force is formed that increases evacuation of the first flow of air through the condenser fan outlet.

2. A method in accordance with claim 1 further comprising:
    channeling a first flow of air through the first inlet of the ejector pump at a first velocity; and
    channeling a second flow of air through the second inlet of the ejector pump at a second velocity, the second velocity being greater than said first velocity.

3. A method in accordance with claim 2 wherein the second velocity being greater than said first velocity further comprises providing a pressure difference that facilitates entraining the first flow of air with the second flow of air forming a combined flow of air that exits the ejector pump through the airflow outlet.

4. A method in accordance with claim 3 wherein providing a pressure difference facilitates a decrease in temperature of air passing through the condenser fan inlet.

5. A method in accordance with claim 1 further comprising coupling air ventilation conduit to the second airflow inlet with an ancillary conduit.

6. A method for exhausting air from an aircraft galley chiller, said method comprising:
    channeling a first flow of air having a first pressure through a first airflow inlet of an ejector pump at a first velocity;
    channeling a second flow of air having a second pressure through a second airflow inlet of the ejector pump at a second velocity, the second flow of air produced by operating a ventilation fan, and said second velocity being greater than said first velocity; and
    increasing a velocity of the second flow of air with the ejector pump to decrease the second pressure and to define a pressure difference between the first pressure and the second pressure that facilitates generating a suction force that increases flow of the first flow of air towards the first airflow inlet, wherein the first flow of air and the second flow of air form a combined flow of air that exits the ejector pump through an airflow outlet of the ejector pump.

7. A method for exhausting air in accordance with claim 6 further comprising coupling an aircraft galley chiller to the first airflow inlet of the ejector pump.

8. A method in accordance with claim 7 further comprising coupling a ventilation assembly to the second airflow inlet of the ejector pump.

9. A method in accordance with claim 8 further comprising coupling the ventilation assembly to an outflow valve.

10. A method in accordance with claim 9 further comprising coupling a bypass fan inlet upstream from the ventilation assembly.

11. The method in accordance with claim 5, wherein coupling air ventilation conduit to the second airflow inlet with an ancillary conduit comprises extending the air ventilation conduit from the ancillary conduit such that a first portion of the second flow of air is channeled towards the ejector pump, and a second portion of the second flow of air is channeled towards an outflow valve.

12. The method in accordance with claim 1 further comprising coupling a condenser between the condenser fan inlet and the condenser fan outlet, the condenser including a fan operable to produce the first flow of air.

13. The method in accordance with claim 1, wherein coupling the first airflow inlet comprises coupling the first airflow inlet in flow communication with an aircraft galley chiller such that the first flow of air includes heated exhaust air exiting the aircraft galley chiller.

14. The method in accordance with claim 1 further comprising coupling a ventilation fan within the air ventilation conduit, the ventilation fan operable to produce the second flow of air.

15. The method in accordance with claim 14 further comprising coupling the air ventilation conduit in flow communication with a bypass fan inlet configured to provide a substantially constant airflow towards the ventilation fan.

16. The method in accordance with claim 6, wherein channeling a first flow of air comprises channeling the first flow of air that includes heated exhaust air exiting the aircraft galley chiller.

17. The method in accordance with claim 16, wherein increasing a velocity of the second flow of air comprises increasing a velocity of the heated exhaust air such that an inlet temperature at a condenser of the aircraft galley chiller is reduced.

18. The method in accordance with claim 6, wherein channeling a first flow of air comprises operating a fan of a condenser to produce the first flow of air.

19. The method in accordance with claim 6 further comprising channeling a substantially constant airflow towards the ventilation fan through a bypass fan inlet.

* * * * *